United States Patent
Stoenner

[19]

[11] Patent Number: 6,054,881
[45] Date of Patent: *Apr. 25, 2000

[54] INPUT/OUTPUT (I/O) BUFFER SELECTIVELY PROVIDING RESISTIVE TERMINATION FOR A TRANSMISSION LINE COUPLED THERETO

[75] Inventor: David W. Stoenner, Fuquay-Varina, N.C.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/005,234

[22] Filed: Jan. 9, 1998

[51] Int. Cl.$^7$ ........................................ H03B 1/00
[52] U.S. Cl. ............................. 327/112; 326/30
[58] Field of Search .................. 326/30, 82, 85, 326/86, 87, 90, 91; 327/108, 109, 110, 111, 112

[56] References Cited

U.S. PATENT DOCUMENTS

| | | | |
|---|---|---|---|
| 4,408,135 | 10/1983 | Yuyama et al. | 307/474 |
| 4,604,731 | 8/1986 | Konishi | 365/203 |
| 4,859,877 | 8/1989 | Cooperman et al. | 307/443 |
| 4,952,818 | 8/1990 | Erdelyi et al. | 307/270 |
| 5,095,230 | 3/1992 | Takai et al. | 307/451 |
| 5,220,216 | 6/1993 | Woo | 307/469 |
| 5,319,258 | 6/1994 | Ruetz | 307/443 |
| 5,329,190 | 7/1994 | Igarashi et al. | 307/540 |
| 5,387,824 | 2/1995 | Michelsen | 326/83 |
| 5,568,060 | 10/1996 | Bartholomay et al. | 326/86 |
| 5,652,528 | 7/1997 | Kimura et al. | 326/83 |
| 5,726,583 | 3/1998 | Kaplinsky | 326/30 |
| 5,731,711 | 3/1998 | Gabara | 326/30 |
| 5,852,579 | 12/1998 | Arcoleo et al. | 365/189.05 |

*Primary Examiner*—Jeffrey Zweizig
*Attorney, Agent, or Firm*—Kevin L. Daffer; Conley, Rose & Tayon

[57] ABSTRACT

An input/output (I/O) buffer is presented which selectively provides resistive termination for a transmission line coupled to an input/output node. The I/O buffer includes the input/output node, a first output driver stage, a second output driver stage, a differential amplifier, and an input termination stage. The first output driver stage is enabled when resistive termination of the transmission line is not required (e.g., when an older bus standard is to be supported). The second output driver stage is enabled when resistive termination of the transmission line is required (e.g., when a higher performance bus is to be supported). The differential amplifier produces a logic high input signal when a voltage driven upon the input/output node by the transmission line is greater than a reference voltage, and produces a logic low input signal at the output terminal when the voltage driven upon the input/output node by the transmission line is less than the reference voltage. In one embodiment, the input termination stage includes a termination node, a resistive element coupled between the input/output node and the termination node, and a time delay unit. The time delay unit receives the input signal produced by the differential amplifier and produces a time-delayed input signal after a predetermined time delay has elapsed. The termination node is selectively coupled to either the power supply potential or the ground potential dependent upon the time-delayed input signal produced by the time delay unit.

32 Claims, 2 Drawing Sheets

INPUT/OUTPUT (I/O) BUFFER SELECTIVELY PROVIDING RESISTIVE TERMINATION FOR A TRANSMISSION LINE COUPLED THERETO

BACKGROUND OF THE INVENTION

1. Field of the Invention

This invention relates to digital integrated circuits, and more particularly to input/output (I/O) buffer circuits connected to I/O pads of integrated circuits and to terminals of semiconductor device packages.

2. Description of the Relevant Art

Digital electronic devices typically communicate via electrical signals (e.g., voltage and/or current) driven upon electrical conductors (e.g., metal wires). Simultaneous transmission of multiple signals is accommodated by several signal lines routed in parallel (i.e., buses). Most computer systems have a modular architecture centered around a bus which serves as a shared communication link between system components. The two major advantages of shared buses over direct communication links between system components are versatility and low cost. By defining a standard interconnection scheme for a given bus, new devices may be easily connected to the bus. The cost of the bus is low because it is shared among the number of components connected to the bus.

As the operating frequencies (i.e., "speeds") of digital electronic devices increase, the signal lines used to route signals between components begin to behave like transmission lines. Transmission lines have characteristic impedances. If the input impedance of a receiving component connected to a transmission line does not match the characteristic impedance of the transmission line, a portion of an incoming signal is reflected back toward a sending component. Such reflections cause the received signal to be distorted. If the distortion is great enough, the receiving component may erroneously interpret the logical value of the incoming signal.

Digital signals have logic low (i.e., "0") levels, logic high (i.e., "1") levels, "rise times" associated with transitions from the logic low level to the logic high level, and "fall times" associated with transitions from the logic high level to the logic low level. A signal line behaves like a transmission line when the signal rise time (or signal fall time) is short with respect to time required for the signal tore the length of the signal line (i.e., the propagation delay time of the signal line). As a general rule, a signal line behaves like a transmission line when the propagation delay time of the signal line is greater than about one-quarter of the signal rise time (or signal fall time).

Resistive "termination" techniques are often applied to signal lines long enough to behave like transmission lines in order to reduce reflections and the resultant signal distortion. One or more electrically resistive elements are added between each sending component and the signal line (i.e., transmission line) in order to cause the effective output impedances of the sending components to more closely match the characteristic impedance of the transmission line. Similarly, one or more electrically resistive elements are added between each receiving component and the transmission line in order to cause the effective input impedances of the receiving components to more closely match the characteristic impedance of the transmission line.

Several new buses have been developed to meet the needs of high-frequency (i.e., "fast") digital electronic devices, one of which is based upon Gunning Transceiver Logic (GTL). GTL bus technology employs resistive termination of signal lines, and reduces current flowing through pull-up resistors (typically 50 ohms) placed at opposite ends of each signal line by using a relatively small termination voltage (typically 1.2 volts). A GTL driver is typically an open drain n-channel metal oxide semiconductor (MOS) transistor. An external pull-up resistor (typically 50 ohms) connects the drain of the n-channel transistor to the termination voltage. A GTL receiver is typically a differential amplifier with one terminal connected to a reference voltage (typically 0.8 volts).

Employing a high performance bus technology such as GTL within an existing system requires that all the input/output (I/O) buffers within each component connected to the GTL bus be redesigned. With modern packaged integrated circuits having hundreds of terminals, this alone is a substantial undertaking. In addition, the new components containing the redesigned I/O buffers may not support older bus standards.

It would be beneficial to have an I/O buffer which selectively provides resistive termination required to support higher performance buses (i.e., increased data transfer rates). Such an I/O buffer would be able to provide the impedance matching required by higher performance bus technologies while maintaining the ability to support older bus standards not requiring resistive termination.

SUMMARY OF THE INVENTION

The problems outlined above are in large part solved by an input/output (I/O) buffer which selectively provides resistive termination for a transmission line coupled to an input/output node. The I/O buffer includes the input/output node, a first output driver stage, a second output driver stage, a differential amplifier, and an input termination stage. The first output driver stage is enabled when resistive termination of the transmission line is not required (e.g., when an older bus standard is to be supported). The second output driver stage is enabled when resistive termination of the transmission line is required (e.g., when a higher performance bus is to be supported). Only one of the two driver stages is active at any given time, dependent upon the value of a signal received from external circuitry.

The first output driver stage includes a first switching element (e.g., a p-channel metal oxide semiconductor (MOS) transistor) coupled between the input/output node and a power supply potential (Vcc), and a second switching element (e.g., an n-channel MOS transistor) coupled between the input/output node and a ground potential. The second driver stage includes a third switching element (e.g., a p-channel MOS transistor) coupled in series with a first resistive element between the input/output node and the power supply potential (Vcc), and a fourth switching element (e.g., an n-channel MOS transistor) coupled in series with a second resistive element between the input/output node and the ground potential. The sum of an intrinsic (i.e., internal) resistance of the p-channel MOS transistor of the second output driver stage and the resistance of the first resistive element is preferably substantially equal to a characteristic impedance of the transmission line. Similarly, the sum of an internal resistance of the n-channel MOS transistor of the second output driver stage and the resistance of the second resistive element is also preferably substantially equal to a characteristic impedance of the transmission line. In this manner, the transmission line is resistively terminated such that signal distortion at a receiving component connected to an end of the transmission line opposite the end connected to the I/O buffer is minimized.

The differential amplifier has a positive input terminal, a negative input terminal, and an output terminal. The positive input terminal is connected to the input/output node, and the negative input terminal is connected to a reference potential (Vref). The differential amplifier produces a logic high input signal at the output terminal when the voltage driven upon the input/output node by the transmission line is greater than Vref, and produces a logic low input signal at the output terminal when the voltage driven upon the input/output node by the transmission line is less than Vref.

In one embodiment, the input termination stage includes a termination node, a fifth switching element (e.g., a p-channel MOS transistor) coupled between the termination node and the power supply potential (Vcc), a sixth switching element (e.g., an n-channel MOS transistor) coupled between the termination node and the ground potential, a third resistive element coupled between the input/output node and the termination node, and a time delay unit. The time delay unit receives the input signal produced by the differential amplifier and produces a time-delayed input signal after a predetermined time delay has elapsed. The termination node is selectively coupled to either the power supply potential (by the p-channel transistor) or the ground potential (by the n-channel transistor) dependent upon the time-delayed input signal produced by the time delay unit. When the input signal transitions from a logic low level to a logic high level, the termination node is first coupled to the ground potential. After the predetermined delay time of the time delay unit has elapsed, the termination node is coupled to the power supply potential (Vcc), reinforcing the received logic high input signal and reducing power dissipation. When the input signal transitions from a logic high level to a logic low level, the termination node is first coupled to the power supply potential (Vcc). After the predetermined delay time of the time delay unit has elapsed, the termination node is coupled to the ground potential, reinforcing the received logic low input signal and reducing power dissipation.

The input/output node is coupled to either the ground potential (during a logic low to logic high transition) or the power supply potential (during a logic high to logic low transition) through the third resistive element for the delay time of the time delay unit. The resistance of the third resistive element is preferably selected to be substantially equal to the characteristic impedance of the transmission line. Thus the transmission line is resistively terminated for the predetermined time delay of the time delay unit. The delay time of the time delay unit may be, for example, substantially equal to the amount of time it takes the signal to propagate the length of the transmission line in order to ensure that the transmission line is resistively terminated for the entire rise and fall times of the signals.

In an alternate embodiment of the input termination stage, the fifth switching element is coupled in series with a resistive element between the input/output node and the power supply potential (Vcc), and the sixth switching element is coupled in series with a resistive element between the input/output node and the ground potential. In this case, the input/output node is selectively coupled to either: (i) the power supply potential through the intrinsic resistance of the p-channel transistor and the resistance of the resistive element in series with the p-channel transistor, or (ii) the ground potential through the intrinsic resistance of the n-channel transistor and the resistance of the resistive element in series with the n-channel transistor. The sum of the intrinsic resistance of the fifth switching element and the resistance of the resistive element in series with the fifth switching element is preferably selected to be substantially equal to the characteristic impedance of the transmission line. Similarly, the sum of the intrinsic resistance of the sixth switching element and the resistance of the resistive element in series with the sixth switching element is preferably selected to be substantially equal to the characteristic impedance of the transmission line.

The selective coupling action is again dependent upon the time-delayed input signal produced by the time delay unit. When the input signal transitions from a logic low level to a logic high level, the input/output node is first coupled to the ground potential through the intrinsic resistance of the n-channel transistor and the resistance of the resistive element in series with the n-channel transistor. After the predetermined delay time of the time delay unit has elapsed, the input/output node is coupled to the power supply potential (Vcc) through the intrinsic resistance of the p-channel transistor and the resistance of the resistive element in series with the p-channel transistor, reinforcing the received logic high input signal and reducing power dissipation. When the input signal transitions from a logic high level to a logic low level, the input/output node is first coupled to the power supply potential (Vcc) through the intrinsic resistance of the p-channel transistor and the resistance of the resistive element in series with the p-channel transistor. After the predetermined delay time of the time delay unit has elapsed, the input/output node is coupled to the ground potential through the intrinsic resistance of the n-channel transistor and the resistance of the resistive element in series with the n-channel transistor, reinforcing the received logic low input signal and reducing, power dissipation.

BRIEF DESCRIPTION OF THE DRAWINGS

Other objects and advantages of the invention will become apparent upon reading the following detailed description and upon reference to the accompanying drawings in which.

Figure 1:
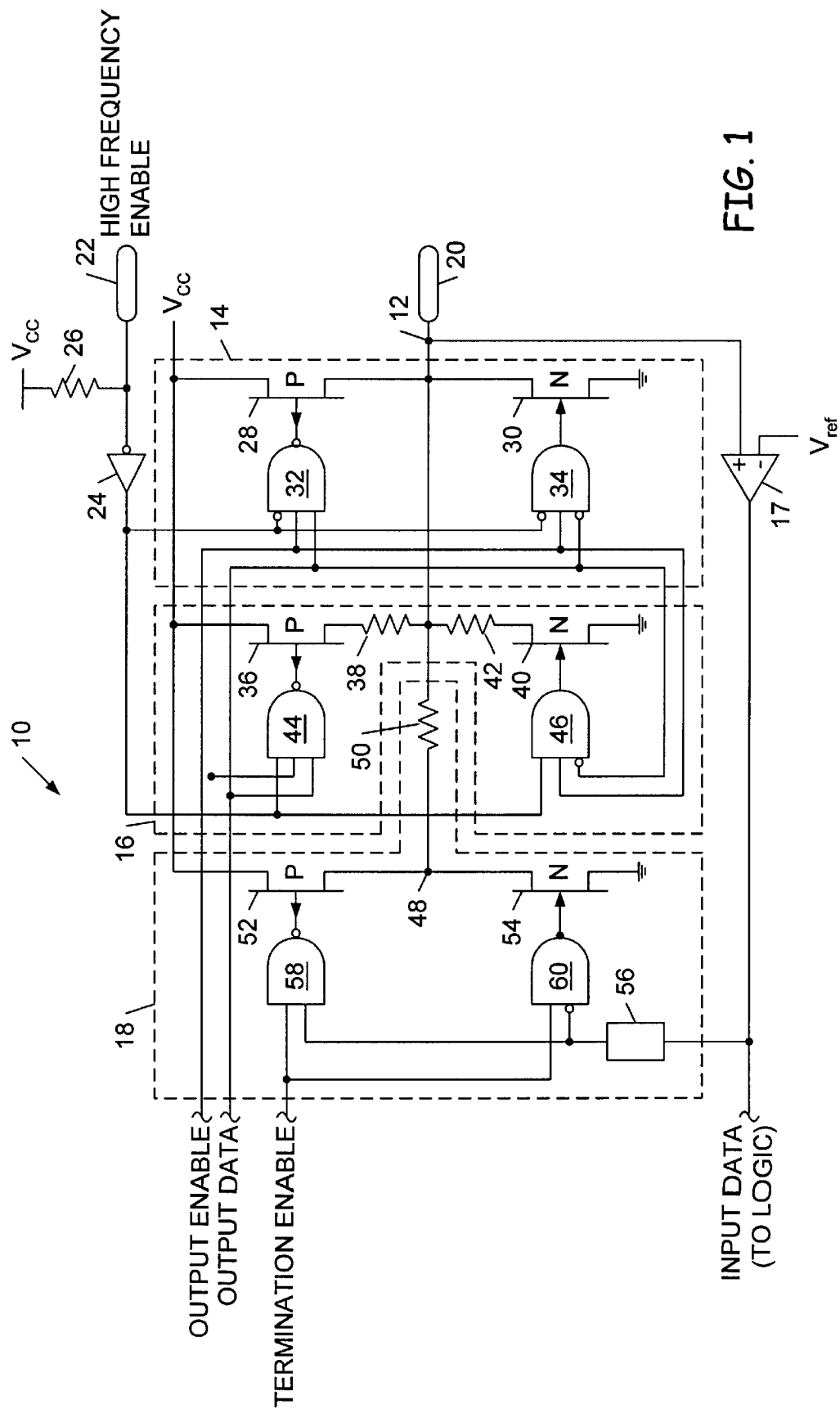
FIG. 1 is a circuit diagram of a first implementation of an input/output (I/O) buffer in accordance with the present invention, wherein the I/O buffer selectively provides resistive termination for a transmission line coupled to an input/output node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a circuit diagram of a first implementation of an input/output (I/O) buffer 10 in accordance with the present invention. I/O buffer 10 includes an input/output node 12, a first output driver stage 14, a second output driver stage 16, a differential amplifier 17, and an input termination stage 18. I/O buffer 10 is preferably formed as part of an integrated circuit, and selectively provides resistive termination for a transmission line connected to an I/O pad 20 coupled to input/output node 12. An external power supply (not shown) provides electrical power between a power supply potential (Vcc) and a ground potential, wherein the power supply potential (Vcc) exceeds the ground potential.

First output driver stage 14 is enabled when resistive termination of the transmission line connected to I/O pad 20 is not required (e.g., when an older bus standard is to be supported). Second output driver stage 16 is enabled when resistive termination of the transmission line is required (e.g., when a higher performance bus is to be supported). Only one output driver stage is enabled at any given time, dependent upon the value of an inverted "high frequency enable" (HFE) signal received at an I/O pad 22. An inverter 24 receives signal HFE' at an input terminal and produces signal HFE at an output terminal. Signal HFE is provided to both first driver stage 14 and second driver stage 16. When an external circuit coupled to I/O pad 22 drives signal HFE' high, signal HFE is a logic low. When signal HFE is a logic low, first output driver stage 14 is enabled, and second driver stage 16 is disabled. When the external circuit drives signal HFE' low, signal HFE is a logic high, first output driver stage 14 is disabled, and second driver stage 16 is enabled. A pull-up resistor 26 coupled between the input terminal of inverter 24 and the power supply potential (Vcc) ensures signal HFE is a logic low (i.e., first output driver stage 14 is enabled and second driver stage 16 is disabled) when I/O pad 22 is not driven by an external circuit.

First driver stage 14 includes a first p-channel metal oxide semiconductor (MOS) transistor 28 coupled between input/output node 12 and the power supply potential (Vcc), and a first n-channel MOS transistor 30 coupled between input/output node 12 and the ground potential. P-channel transistor 28 is driven by a logic gate 32, and n-channel transistor 30 is driven by a logic gate 34. Logic gates 32 and 34 receive the HFE signal, an "output enable" (OE) signal, and an "output data" (OD) signal. The OE and OD signals are generated by logic circuitry coupled to I/O buffer 10. The OE signal is a logic high when data is to be driven upon the transmission line connected to I/O pad 20, and is a logic low otherwise. The OD signal is the data to be driven upon the transmission line.

When the HFE signal is a logic high or the OE signal is a logic low, logic gate 32 always produces a logic high output signal coupled to a gate terminal of p-channel transistor 28, and logic gate 34 always produces a logic low output signal coupled to a gate terminal of n-channel transistor 30. Thus both p-channel transistor 28 and n-channel transistor 30 are held in a low-conductance state (i.e., "turned off"), and neither p-channel transistor 28 nor n-channel transistor 30 drives input/output node 12.

When the HFE signal is a logic low and the OE signal is a logic high, logic gate 32 produces the inverted OD signal (OD') coupled to the gate terminal of p-channel transistor 28, and logic gate 34 produces the OD' signal coupled to the gate terminal of n-channel transistor 30. When the OD' signal is a logic low, p-channel transistor 28 is in a high-conductance state (i.e., "turned on"), n-channel transistor 30 is in the low-conductance state, and input/output node 12 is coupled to the power supply potential (Vcc) through the intrinsic (i.e., internal) resistance of p-channel transistor 28. When the OD' signal is a logic high, n-channel transistor 30 is in the high-conductance state, p-channel transistor 28 is in the low-conductance state, and input/output node 12 is coupled to the ground potential through the intrinsic resistance of n-channel transistor 30. Thus the series combination of p-channel transistor 28 and n-channel transistor 30 drives input/output node 12 with the OD signal.

Second driver stage 16 includes a second p-channel MOS transistor 36 coupled in series with a first resistive element 38 between input/output node 12 and the power supply potential (Vcc), and a second n-channel MOS transistor 40 coupled in series with a second resistive element 42 between input/output node 12 and the ground potential. P-channel transistor 36 is driven by a logic gate 44, and n-channel transistor 40 is driven by a logic gate 46.

Logic gates 44 and 46 receive the HFE, OE, and OD signals. When the HFE signal or the OE signal is a logic low, logic gate 44 always produces a logic high output signal coupled to a gate terminal of p-channel transistor 36, and logic gate 46 always produces a logic low output signal coupled to a gate terminal of n-channel transistor 40. Thus both p-channel transistor 36 and n-channel transistor 40 are held in the low-conductance state (i.e., "turned off"), and neither p-channel transistor 36 nor n-channel transistor 40 drives input/output node 12.

When the HFE and OE signals are both logic high, logic gate 44 produces the inverted OD signal (OD') coupled to the gate terminal of p-channel transistor 36, and logic gate 46 produces the OD' signal coupled to the gate terminal of n-channel transistor 40. When the OD' signal is a logic low, p-channel transistor 36 is in the high-conductance state, n-channel transistor 40 is in the low-conductance state, and input/output node 12 is coupled to the power supply potential (Vcc) through the intrinsic resistance of p-channel transistor 36 and the resistance of resistive element 38. When the OD' signal is a logic high, n-channel transistor 40 is in the high-conductance state, p-channel transistor 36 is in the low-conductance state, and input/output node 12 is coupled to the ground potential through the intrinsic resistance of n-channel transistor 40 and the resistance of resistive element 42. Thus the series combination of p-channel transistor 36 and n-channel transistor 40 drives input/output node 12 with the OD signal.

The sum of the intrinsic resistance of p-channel transistor 36 when in the high-conductance state and the resistance of resistive element 38 is preferably made substantially equal to the characteristic impedance of the transmission line operably coupled to I/O pad 20. Similarly, the sum of the intrinsic resistance of n-channel transistor 40 when in the high-conductance state and the resistance of resistive element 42 is preferably made substantially equal to the characteristic impedance of the transmission line. For example, when the characteristic impedance of the transmission line is 50 ohms, the intrinsic resistance of p-channel transistor 36 when in the high-conductance state is 35 ohms, and the intrinsic resistance of n-channel transistor 40 when in the high-conductance state is 30 ohms, the resistance value of resistive element 38 is preferably selected to be about 15 ohms, and the resistance value of resistive element 42 is preferably selected to be about 20 ohms. In this manner, when the HFE signal is a logic high, the transmission line is resistively terminated such that signal distortion at a receiving component connected to an end of the transmission line opposite the end connected to I/O buffer 10 is minimized.

Differential amplifier 17 has a positive input terminal connected to input/output node 12 and a negative input terminal connected to a reference potential (Vref). When the voltage at input/output node 12 is greater than Vref, differential amplifier 17 produces a logic high input signal its output. When the voltage at input/output node 12 is less than Vref differential amplifier 17 produces a logic low input signal at its output. The input signal is provided to logic circuitry external to I/O buffer 10 and to input termination stage 18.

Input termination stage 18 includes a termination node 48, a third resistive element 50 coupled between input/output node 12 and termination node 48, a third p-channel MOS transistor 52 coupled between termination node 48 and the power supply potential (Vcc), a third n-channel MOS transistor 54 coupled between termination node 48 and the ground potential, a time delay unit 56, a logic gate 58 which drives p-channel transistor 52, and a logic gate 60 which drives n-channel transistor 54. Time delay unit 56 receives the input signal produced by differential amplifier 17 and reproduces the input signal at the output of time delay unit 56 after a predetermined time delay has elapsed. When enabled, p-channel transistor 52 and n-channel transistor 54 selectively couple termination node 48 to either the power supply potential (Vcc) or the ground potential dependent upon the value of the time-delayed input signal produced by time delay unit 56.

Logic gates 58 and 60 receive a "termination enable" (TE) signal generated by the external circuitry coupled to I/O buffer 10. The output of logic gate 58 is coupled to the gate terminal of p-channel transistor 52, and the output of logic gate 60 is coupled to the gate terminal of n-channel transistor 54. When the TE signal is a logic low, logic gate 58 produces a logic high, and p-channel transistor 52 is held in the low-conductance state. Logic gate 60 produces a logic low, and n-channel transistor 54 is also held in the low-conductance state. Thus when the TE signal is a logic low, neither p-channel transistor 52 nor n-channel transistor 54 drives termination node 48 (i.e., termination node 48 "floats"), and input signals received from the transmission line coupled to I/O pad 20 are not resistively terminated.

When the TE signal is a logic high and the transmission line coupled to I/O pad 20 drives a logic low signal upon I/O pad 20, differential amplifier 17 produces a logic low input signal. When the input signal has been a logic low for a time period greater than the delay time of time delay unit 56, time delay unit 56 produces a logic low, logic gate 58 produces a logic high, and logic gate 60 also produces a logic high. P-channel transistor 52 is in the low-conductance state, and n-channel transistor 54 is in the high-conductance state. Thus n-channel transistor 54 couples termination node 48 to the ground potential.

Should the transmission line coupled to I/O pad 20 drive a logic high signal upon I/O pad 20, the input signal produced by differential amplifier 17 transitions from the logic low to a logic high. The output of time delay unit 56, however, does not change for the predetermined time delay of time delay unit 56, and n-channel transistor 54 continues to couple termination node 48 to the ground potential for the predetermined time delay. Input/output node 12 is coupled to the ground potential through resistive element 50 for the delay time of time delay unit 56. The resistance of resistive element 50 is preferably selected to be substantially equal to the characteristic impedance of the transmission line coupled to I/O pad 20. Thus the transmission line is resistively terminated for the predetermined time delay of time delay unit 56. The delay time of time delay 56 may be, for example, substantially equal to the amount of time it takes the signal to propagate the length of the transmission line in order to ensure that the transmission line is resistively terminated for the entire rise time of the signal.

Following the predetermined time delay of time delay unit 56, the output of time delay unit 56 changes from a logic low to a logic high, logic gate 58 produces a logic low, and logic gate 60 also produces a logic low. P-channel transistor 52 transitions from the low-conductance state to the high-conductance state, and n-channel transistor 54 transitions from the high-conductance state to the low-conductance state. Thus p-channel transistor 52 couples termination node 48 to the power supply potential (Vcc). This action couples input/output node 12 to the power supply potential (Vcc) through resistive element 50, reinforcing the logic high signal being received from the transmission line coupled to I/O pad 20 and reducing power dissipation.

Should the transmission line coupled to I/O pad 20 drive a logic low signal upon I/O pad 20, the input signal produced by differential amplifier 17 transitions from the logic high to a logic low. The output of time delay unit 56, however, does not change for the predetermined time delay of time delay unit 56, and p-channel transistor continues to couple termination node 48 to the power supply potential (Vcc) for the predetermined time delay. Input/output node 12 is coupled to the power supply potential (Vcc) through resistive element 50. As stated above, the resistance of resistive element 50 is preferably selected to be substantially equal to the characteristic impedance of the transmission line coupled to I/O pad 20. Again, the delay time of time delay 56 may be, for example, substantially equal to the amount of time it takes the signal to propagate the length of the transmission line in order to ensure that the transmission line is resistively terminated for the entire fall time of the signal.

Following the predetermined time delay of time delay unit 56, the output of time delay unit 56 changes from a logic high to a logic low, logic gate 58 produces a logic high, and logic gate 60 also produces a logic high. P-channel transistor 52 transitions from the high-conductance state to the low-conductance state, and n-channel transistor 54 transitions from the low-conductance state to the high-conductance state. Thus n-channel transistor 54 couples termination node 48 to the ground potential. This action couples input/output node 12 to the ground potential through resistive element 50, reinforcing the logic low signal being received from the transmission line coupled to I/O pad 20 and reducing power dissipation.

Figure 2:
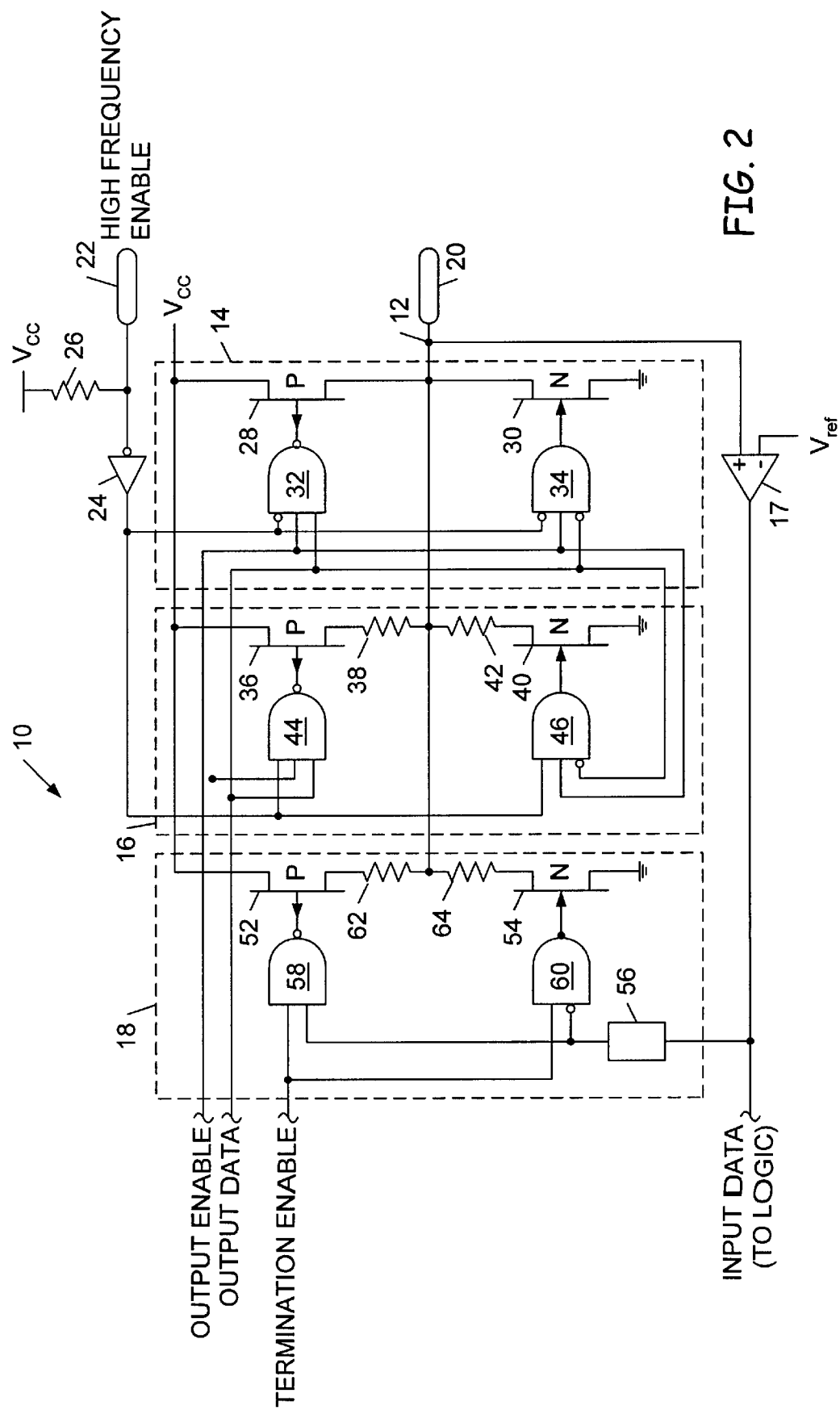
FIG. 2 is a circuit diagram of a second implementation of the I/O buffer.

FIG. 2 is a circuit diagram of a second implementation of I/O buffer 10. In the implementation of FIG. 2, input termination stage 18 includes third p-channel MOS transistor 52 coupled in series with a resistive element 62 between input/output node 12 and the power supply potential (Vcc), and third n-channel MOS transistor 54 coupled in series with a resistive element 64 between input/output node 12 and the ground potential. P-channel transistor 52 is driven by a logic gate 58 as described above, and n-channel transistor 54 is driven by a logic gate 60 as described above. The sum of the intrinsic resistance of p-channel transistor 52 when in the high-conductance state and the resistance of resistive element 62 is preferably made substantially equal to the characteristic impedance of the transmission line operably coupled to I/O pad 20. Similarly, the sum of the intrinsic resistance of n-channel transistor 54 when in the high-conductance state and the resistance of resistive element 64 is preferably made substantially equal to the characteristic impedance of the transmission line.

When the TE signal is a logic high, the transmission line coupled to I/O pad 20 drives a logic low signal upon I/O pad 20, and the input signal has been a logic low for a time period greater than the delay time of time delay unit 56, p-channel transistor 52 is in the low-conductance state, and n-channel transistor 54 is in the high-conductance state. Thus input/output node 12 is coupled to the ground potential through the sum of the intrinsic resistance of n-channel transistor 54 and the resistance of resistive element 64.

Should the transmission line coupled to I/O pad 20 drive a logic high signal upon I/O pad 20, the input signal produced by differential amplifier 17 transitions from the logic low to a logic high. The output of time delay unit 56, however, does not change for the predetermined time delay of time delay unit 56, and n-channel transistor 54 continues to couple input/output node 12 to the ground potential for the predetermined time delay. Input/output node 12 is coupled to the ground potential through the intrinsic resistance of n-channel transistor 54 and the resistance of resistive element 64 for the delay time of time delay unit 56. The sum of the intrinsic resistance of n-channel transistor 54 and the resistance of resistive element 64 is preferably selected to be substantially equal to the characteristic impedance of the transmission line coupled to I/O pad 20. Thus the transmission line is resistively terminated for the predetermined time delay of time delay unit 56.

Following the predetermined time delay of time delay unit 56, the output of time delay unit 56 changes from a logic low to a logic high, logic gate 58 produces a logic low, and logic gate 60 also produces a logic low. P-channel transistor 52 transitions from the low-conductance state to the high-conductance state, and n-channel transistor 54 transitions from the high-conductance state to the low-conductance state. Thus input/output node 12 is coupled to the power supply potential (Vcc) through the intrinsic resistance of p-channel transistor 52 and the resistance of resistive element 62, reinforcing the logic high signal being received from the transmission line coupled to I/O pad 20 and reducing power dissipation.

Should the transmission line coupled to I/O pad 20 drive a logic low signal upon I/O pad 20, the input signal produced by differential amplifier 17 transitions from the logic high to a logic low. The output of time delay unit 56, however, does not change for the predetermined time delay of time delay unit 56, and input/output node 12 continues to be coupled to the power supply potential (Vcc) through the intrinsic resistance of p-channel transistor 52 and the resistance of resistive element 62 for the predetermined time delay. As stated above, the sum of the intrinsic resistance of p-channel transistor 52 and the resistance of resistive element 62 is preferably selected to be substantially equal to the characteristic impedance of the transmission line coupled to I/O pad 20.

Following the predetermined time delay of time delay unit 56, the output of time delay unit 56 changes from a logic high to a logic low, logic gate 58 produces a logic high, and logic gate 60 also produces a logic high. P-channel transistor 52 transitions from the high-conductance state to the low-conductance state, and n-channel transistor 54 transitions from the low-conductance state to the high-conductance state. Thus input/output node 12 is coupled to the ground potential through the intrinsic resistance of n-channel transistor 54 and the resistance of resistive element 64, reinforcing the logic low signal being received from the transmission line coupled to I/O pad 20 and reducing power dissipation.

It is noted that first driver stage 14 and second driver stage 16 may be combined to form an unidirectional output buffer. In this case, differential amplifier 17 and input termination stage 18 and are omitted from the input/output buffer of FIGS. 1 and 2, and input/output node 12 becomes an output node. It is also noted that differential amplifier 17 and input termination stage 18 may be combined to form a unidirectional input buffer. In this case, first driver stage 14 and second driver stage 16 are omitted, and input/output node 12 becomes an input node.

It will be appreciated by those skilled in the art having the benefit of this disclosure that this invention is believed to be an input/output (I/O) buffer which selectively provides resistive termination of a transmission line coupled thereto. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. An input/output (I/O) buffer circuit, comprising:
   a first output driver stage operably coupled to an input/output node and configured to drive the input/output node, wherein the first output driver is enabled when resistive termination of a transmission line connected to the input/output node is not required;
   a second output driver stage operably coupled to the input/output node and configured to drive the input/output node with an electrical resistance substantially equal to a characteristic impedance of the transmission line, wherein the second output driver stage is enabled when resistive termination of the transmission line is required;
   an input termination stage operably coupled to the input/output node and configured to:
   (i) provide resistive termination of the transmission line for a period of time following a transition of an input signal, and (ii) reinforce said input signal following said period of time such that electrical power dissipation within the I/O buffer circuit is reduced; and
   wherein said period of time is substantially equal to the amount of time it takes the input signal to propagate the length of the transmission line.

2. The input/output (I/O) buffer circuit as recited in claim 1, wherein the first output driver comprises a first switching element having a resistive value selectively coupled solely between the input/output node and an electrical potential.

3. The input/output (I/O) buffer circuit as recited in claim 2, wherein the electrical potential comprises ground or a voltage exceeding ground.

4. The input/output (I/O) buffer circuit as recited in claim 1, wherein the second output driver comprises a second switching element coupled in series with a resistor between the input/output node and an electrical potential.

5. The input/output (I/O) buffer circuit as recited in claim 4, wherein the electrical potential comprises ground or a voltage exceeding ground.

6. The input/output (I/O) buffer circuit as recited in claim 4, wherein the sum of a resistive value attributed to the second switching element and the resistor is substantially equal to the characteristic impedance of the transmission line coupled to the input/output node.

7. The input/output (I/O) buffer circuit as recited in claim 6, wherein the sum is substantially equal to the impedance during times when the second switching element is in a high conductance state.

8. The input/output (I/O) buffer circuit as recited in claim 1, wherein said input termination stage comprises:
   a resistive element having a first and second terminals, wherein the first terminal connected to the input/output node; and
   a mechanism for maintaining a high conductance connection of the second terminal to an electrical potential for said period of time following the transition of said input signal.

9. The input/output (I/O) buffer circuit as recited in claim 8, wherein the mechanism further changes the high conductance connection to a low conductance connection subsequent to expiration of said period of time.

10. The input/output (I/O) buffer circuit as recited in claim 8, wherein the high conductance connection comprises a switching element responsive to a delayed signal forwarded from a time delay unit, wherein the switching element is coupled between the second terminal and the electrical potential.

11. The input/output (I/O) buffer circuit as recited in claim 8, wherein the electrical potential comprises ground or a voltage exceeding ground.

12. An input/output (I/O) buffer circuit, comprising:
   an input/output node;
   a first output driver stage comprising a first pair of switching elements, wherein one of said first pair of switching elements is coupled between the input/output node and a power supply potential, and wherein the other of said first pair of switching elements is coupled between the input/output node and a ground potential, and wherein the first output driver stage is enabled when resistive termination of a transmission line connected to the input/output node is not required;
   a second output driver stage comprising a second pair of switching elements and a pair of electrically resistive elements, wherein one of said second pair of switching elements is coupled in series with one of said pair of electrically resistive elements between the input/output node and the power supply potential, and
   wherein the other of said second pair of switching elements is coupled in series with the other of said pair of electrically resistive elements between the input/output node and the ground potential, and wherein the second output buffer stage is enabled when resistive termination of the transmission line is required;
   an input termination stage comprising a termination node and a resistive element coupled between the input/output node and the termination node, and wherein the termination node is selectively coupled to either the power supply potential or the ground potential, and wherein the resistive element provides resistive termination of the transmission line for a predetermined time period following transitions of an input signal, and wherein the resistive element reinforces said input signal following said time period such that electrical power dissipation within the I/O buffer circuit is reduced; and
   wherein said time period is substantially equal to the amount of time it takes the input signal to propagate the length of the transmission line.

13. The I/O buffer as recited in claim 12, wherein the first driver section comprises:
   a p-channel metal oxide semiconductor (MOS) transistor coupled between the input/output node and the power supply potential; and
   an n-channel MOS transistor coupled between the input/output node and the ground potential.

14. The I/O buffer as recited in claim 12, wherein the second driver section comprises:
   a p-channel metal oxide semiconductor (MOS) transistor coupled in series with the one of the pair of resistive elements between the input/output node and the power supply potential; and
   an n-channel MOS transistor coupled in series with the other of the pair of resistive elements between the input/output node and the ground potential.

15. The I/O buffer as recited in claim 12, wherein the sum of an intrinsic resistance of the one of said second pair of switching elements and the resistance of the one of said pair of electrically resistive elements is substantially equal to a characteristic impedance of the transmission line.

16. The I/O buffer as recited in claim 12, wherein the sum of an intrinsic resistance of the other of said second pair of switching elements and the resistance of the other of said pair of electrically resistive elements is substantially equal to a characteristic impedance of the transmission line.

17. The I/O buffer as recited in claim 12, wherein the electrical resistance of the resistive element of the input termination stage is substantially equal to the characteristic impedance of the transmission line.

18. The I/O buffer as recited in claim 12, further comprising a differential amplifier having two input terminals and an output terminal, wherein a first input terminal of the differential amplifier is connected to the input/output node, and wherein a second terminal of the differential amplifier is connected to a reference potential, and wherein the differential amplifier is configured to produce the input signal at the output terminal.

19. The I/O buffer as recited in claim 18, wherein the input termination unit further comprises a time delay unit coupled to receive the input signal produced by the differential amplifier and configured to produce a time-delayed input signal at an output terminal following a predetermined delay time, and wherein the time-delayed input signal determines whether the termination node is coupled to the power supply potential or the ground potential.

20. The I/O buffer as recited in claim 19, wherein when the input signal transitions from a logic low level to a logic high level, the termination node is first coupled to the ground potential, and wherein after the predetermined delay time of the time delay unit has elapsed, the termination node is coupled to the power supply potential.

21. The I/O buffer as recited in claim 19, wherein when the input signal transitions from a logic high level to a logic low level, the termination node is first coupled to the power supply potential, and wherein after the predetermined delay time of the time delay unit has elapsed, the termination node is coupled to the ground potential.

22. An input/output (I/O) buffer circuit, comprising:
   an input/output node;
   a first output driver stage, comprising:
      a first p-channel metal oxide semiconductor (MOS) transistor coupled between the input/output node and a power supply potential;
      a first n-channel MOS transistor coupled between the input/output node and a ground potential; and
      wherein the first output driver stage is enabled when resistive termination of a transmission line connected to the input/output node is not required;
   a second output driver stage, comprising:
      a second p-channel MOS transistor coupled in series with a first resistive element between the input/output node and the power supply potential;
      a second n-channel MOS transistor coupled in series with a second resistive element between the input/output node and the ground potential; and
      wherein the second output buffer stage is enabled when resistive termination of the transmission line is required; and
   a differential amplifier having a positive input terminal, a negative input terminal, and an output terminal, wherein the positive input terminal is connected to the input/output node, and wherein the negative input terminal is connected to a reference potential, and wherein the differential amplifier is configured to produce an input signal at the output terminal;

an input termination stage, comprising:
  a termination node;
  a third resistive element coupled between the input/output node and the termination node;
  a time delay unit coupled to receive the input signal produced by the differential amplifier and configured to produce a time-delayed input signal after a predetermined time delay has elapsed;
  wherein said time delay is substantially equal to the amount of time it takes the input signal to propagate the length of the transmission line; and
  wherein the termination node is selectively coupled to either the power supply potential or the ground potential dependent upon the time-delayed input signal produced by the time delay unit such that the input signal is reinforced following said time delay.

23. The I/O buffer as recited in claim 22, wherein the input termination unit further comprises:
  a third p-channel metal oxide semiconductor (MOS) transistor coupled between the termination node and the power supply potential; and
  a third n-channel MOS transistor coupled between the termination node and the ground potential.

24. The I/O buffer as recited in claim 22, wherein the sum of an intrinsic resistance of the second p-channel MOS transistor and the resistance of the first resistive element is substantially equal to a characteristic impedance of the transmission line.

25. The I/O buffer as recited in claim 22, wherein the sum of an intrinsic resistance of the second n-channel MOS transistor and the resistance of the second resistive element is substantially equal to a characteristic impedance of the transmission line.

26. The I/O buffer as recited in claim 22, wherein the electrical resistance of the third resistive element is substantially equal to a characteristic impedance of the transmission line.

27. The I/O buffer as recited in claim 22, wherein when the input signal transitions from a logic low level to a logic high level, the termination node is first coupled to the ground potential, and wherein after the predetermined delay time of the time delay unit has elapsed, the termination node is coupled to the power supply potential.

28. The I/O buffer as recited in claim 22, wherein when the input signal transitions from a logic high level to a logic low level, the termination node is first coupled to the power supply potential, and wherein after the predetermined delay time of the time delay unit has elapsed, the termination node is coupled to the ground potential.

29. An input/output (I/O) buffer circuit, comprising:
  an input/output node;
  a first output driver stage, comprising:
    a first p-channel metal oxide semiconductor (MOS) transistor coupled between the input/output node and a power supply potential;
    a first n-channel MOS transistor coupled between the input/output node and a ground potential; and
    wherein the first output driver stage is enabled when resistive termination of a transmission line connected to the input/output node is not required;
  a second output driver stage, comprising:
    a second p-channel MOS transistor coupled in series with a first resistive element between the input/output node and the power supply potential;
    a second n-channel MOS transistor coupled in series with a second resistive element between the input/output node and the ground potential; and
    wherein the second output buffer stage is enabled when resistive termination of the transmission line is required; and
  a differential amplifier having a positive input terminal, a negative input terminal, and an output terminal, wherein the positive input terminal is connected to the input/output node, and wherein the negative input terminal is connected to a reference potential, and wherein the differential amplifier is configured to produce an input signal at the output terminal;
  an input termination stage, comprising:
    a third p-channel metal oxide semiconductor (MOS) transistor coupled in series with a third resistive element between the input/output node and the power supply potential;
    a third n-channel MOS transistor coupled in series with a fourth resistive element between the input/output node and the ground potential;
    a time delay unit coupled to receive the input signal produced by the differential amplifier and configured to produce a time-delayed input signal after a predetermined time delay has elapsed;
    wherein said time delay is substantially equal to the amount of time it takes the input signal to propagate the length of the transmission line; and
    wherein the input/output node is selectively coupled to either the power supply potential or the ground potential dependent upon the time-delayed input signal produced by the time delay unit such that the input signal is reinforced following said time delay.

30. An input buffer circuit, comprising:
  an input node;
  a differential amplifier having a positive input terminal, a negative input terminal, and an output terminal, wherein the positive input terminal is connected to the input node, and wherein the negative input terminal is connected to a reference potential, and wherein the differential amplifier is configured to produce an input signal at the output terminal; and
  an input termination stage, comprising:
    a termination node;
    a resistive element coupled between the input node and the termination node;
    a time delay unit coupled to receive the input signal produced by the differential amplifier and configured to produce a time-delayed input signal after a predetermined time delay has elapsed;
    wherein said time delay is substantially equal to the amount of time it takes the input signal to propagate the length of the transmission line; and
    wherein the termination node is selectively coupled to either a power supply potential or a ground potential dependent upon the time-delayed input signal produced by the time delay unit such that the input signal is reinforced following said time delay.

31. An input buffer circuit, comprising:
  an input node;
  a differential amplifier having a positive input terminal, a negative input terminal, and an output terminal, wherein the positive input terminal is connected to the input node, and wherein the negative input terminal is connected to a reference potential, and wherein the differential amplifier is configured to produce an input signal at the output terminal; and an input termination stage, comprising:
  a p-channel metal oxide semiconductor (MOS) transistor coupled in series with a first resistive element between the input node and a power supply potential;
  an n-channel MOS transistor coupled in series with a second resistive element between the input node and a ground potential;
  a time delay unit coupled to receive the input signal produced by the differential amplifier and configured to produce a time-delayed input signal after a predetermined time delay has elapsed;
  wherein said time delay is substantially equal to the amount of time it takes the input signal to propagate the length of the transmission line; and
  wherein the input node is selectively coupled to either the power supply potential or the ground potential through the first or second resistive element dependent upon the time-delayed input signal produced by the time delay unit such that the input signal is reinforced following said time delay.

32. An input/output (I/O) buffer circuit, comprising:
a first output driver stage and a second output driver stage operably coupled to an input/output node, wherein said first and second output drivers are coupled to receive a high frequency enable (HFE) signal, an output enable (OE) signal, and an output data (OD) signal;
an input termination stage coupled to receive an input data (ID) signal and a termination enable (TE) signal;
wherein the second output driver is configured to drive the input/output node with an electrical resistance substantially equal to a characteristic impedance of a transmission line connected to the input/output node;
wherein when the HFE signal is deasserted and the OE signal is asserted, the second output driver is disabled and the first output driver stage drives the OD signal upon the input/output node;
wherein when the HFE and OE signals are asserted, the first output driver is disabled and the second output driver stage drives the OD signal upon the input/output node; and
wherein when the TE signal is asserted, the input termination stage: (i) terminates the transmission line in a resistance substantially equal to the characteristic impedance of the transmission for a predetermined period of time following a transition of the ID signal, and (ii) reinforces the ID signal following said predetermined period of time such that electrical power dissipation within the I/O buffer is reduced.

* * * * *